SIGNAL AMPLIFYING CIRCUITS

Filed Sept. 28, 1967

INVENTOR.
REAGH A. STUBBS
BY Philip Subkow
ATTORNEY

United States Patent Office 3,414,834

Patented Dec. 3, 1968

3,414,834

SIGNAL AMPLIFYING CIRCUITS

Reagh A. Stubbs, Long Beach, Calif., assignor to Statham Instruments, Inc., Los Angeles, Calif., a corporation of California Continuation-in-part of application Ser. No. 324,503, Nov. 18, 1963. This application Sept. 28, 1967, Ser. No. 671,268

2 Claims. (Cl. 330—69)

ABSTRACT OF THE DISCLOSURE

The output of, say, a bridge circuit is fed into a first differential amplifier. A second differential amplifier has a current path serially arranged with the input terminals of the first differential amplifier and an electric power source for the bridge. The second differential amplifier is fed by the signal from the first differential amplifier, with the desired output signal for the entire system being taken across output terminals of the two differential amplifiers.

This application is a continuation-in-part of application Ser. No. 324,503, filed Nov. 18, 1963, now abandoned.

*Background of the invention*

In contrast to conventional DC differential amplification systems, in which the amplifier is in parallel with the signal source and also with the signal excitation potential, the system of my invention employs an amplifier in series with the signal source and also with the signal excitation potential source, wherein the signal source is resistive in nature and is in series with the common mode network of the differential amplifier. It is preferred, for ideal operation of the system of my invention, that the current in the common mode network of the differential amplifier, used to excite the signal source, be maintained substantially constant and independent of the signal level to the amplifier.

For such purpose, it is preferred that the impedance of the common mode network of the differential amplifier, connected to the signal source for excitation thereof, be maintained substantially constant and independent of signal strength, and that the excitation potential be maintained substantially constant. The system is particularly applicable to signal sources where the total resistance of the signal source, which the excitation potential "sees," remains substantially constant at substantially all levels of signal strength, and substantially independent of the signal strength.

Particular examples of such signal system are potentiometers or bridges in which the total impedance of the signal system remains substantially constant and independent of signal strength. The variation of the signal comes from a variation in the resistance of a part of the signal impedance. The total impedance of the potentiometer remains constant. Where the signal arises from a differential variation of a plurality of parts of the signal system, such as a Wheatstone bridge, the total of the bridge impedance remains constant. The resistance of the signal source, which is thus connected to the excitation potential in my system, remains substantially constant.

In contrast to systems in which the excitation current in the signal impedance is in parallel with the current flow in the amplifier, in the system of my invention, where such current in the signal source is in series with the current flow in the amplifier, the total current demand of the system is but a fraction of the current demand of the equivalent parallel system.

The reduction in current flow through the impedance of the signal generating means is of importance where current drain is a significant limitation. Additionally, in systems in which the current flow in the signal impedance results in deleterious heating effects, the large reduction obtained by my system in the current flow, in the resistive portion of the signal generating means, results in a great advantage.

*Brief description of the drawings*

This invention will be further described by reference to the following figures.

*Description of a preferred embodiment*

Figures 1, 2:
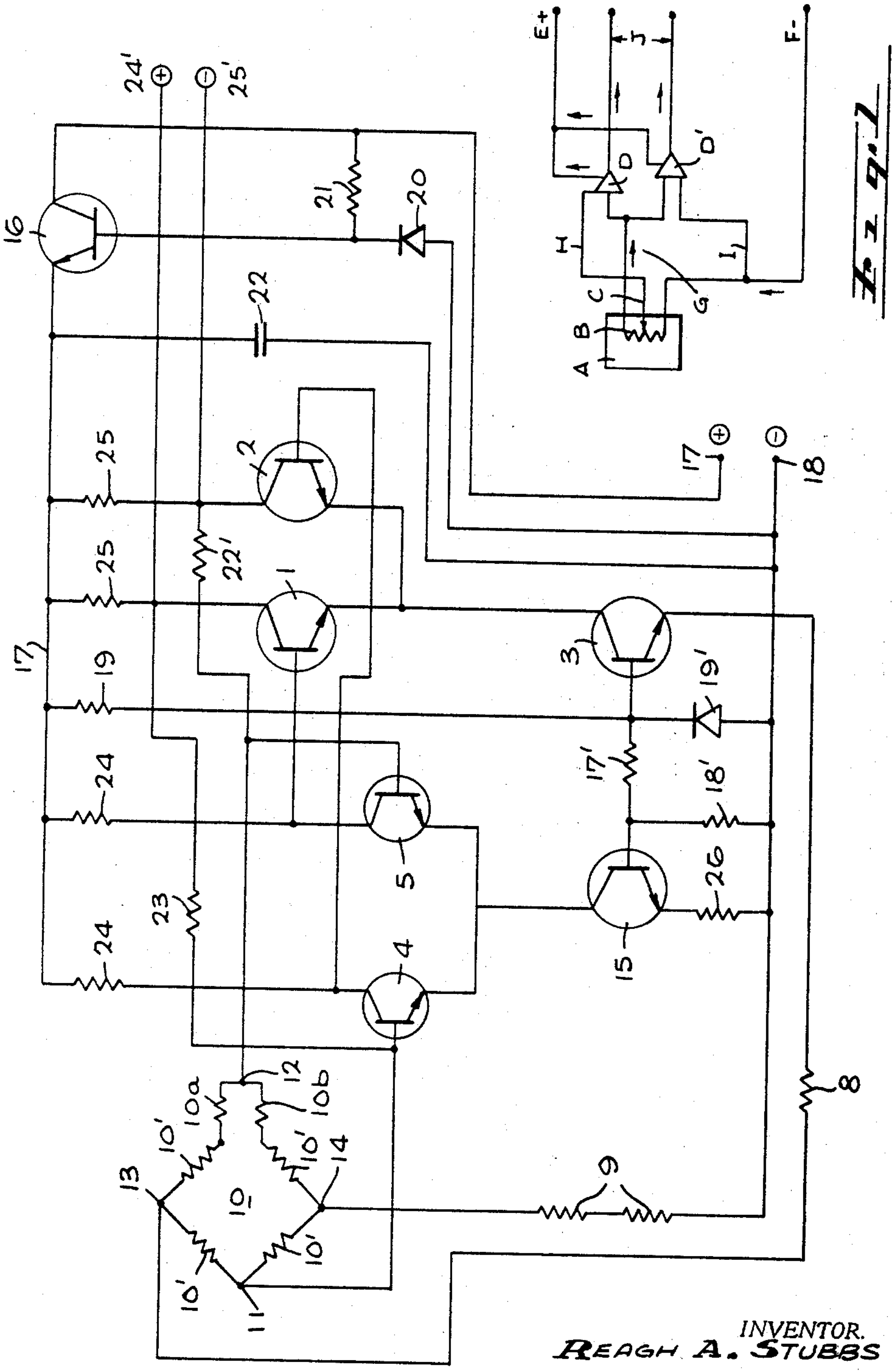
FIG. 1 is a block diagram showing the principles of my invention.
FIG. 2 shows a circuit diagram of a preferred embodiment of the system of FIG. 1.

FIG. 1 shows the basic elements of the system of my invention. The signal source A, illustrated by the potentiometer B, from which a variable signal is obtained at H–I by adjustment of the slide C responsive to a condition sensed by the signal source A, is fed into the differential amplifier at D–D′. The amplified output is taken at J. The differential amplifier D–D′ is powered by a power source E and F, the current energizing the differential amplifier D–D′ passing through the common mode line G to energize potentiometer B. It is to be recognized that the potentiometer B is used to illustrate any resistive signal generating device which must be energized by current passing therethrough to give a DC signal to be applied to the amplifier.

The invention will be further described as applied to a transistorized direct coupled (D.C.) amplifier as shown in FIG. 2, although it is also applicable with a suitable circuit modifications, as will be understood by those skilled in this art, to vacuum tube circuits of like functionality.

In FIG. 2, the signal source constituting a Wheatstone bridge 10, formed of four like impedances 10′ joined at the corners of 11, 12, 13 and 14 and shown to be resistive in nature for purposes of illustration, may be compensated for temperature shifts of the zero balance by the temperature insensitive resistor 10*a*, and the temperature sensitive resistant 10*b*, such as a thermistor, i.e., one of positive temperature coefficient as is conventional in compensation of strain wire bridges as used commercially, for example, the temperature sensitive resistor 10*a* and the temperature insensitive resistor 10*b* forming part of adjacent legs 10′. The bridge is energized, as will be more fully described below, by a current passing through the bridge from the corners 13 and 14.

When the equal resistances of the legs 13–11 and 14–12 are made to be different from the equal resistances 11–14 and 13–12, as for example, by a transducer which changes these resistances as a result of a condition, such as pressure or acceleration, to be sensed by the bridge, the bridge becomes unbalanced and a differential current flows in the bridge which, except for the feedback to be described below, would establish potential difference between 11 and 12.

The resultant signal from the output corners 11 and 12 of the bridge 10 is fed to the bases of a pair of transistors 4 and 5 in differential configuration, acting as a direct coupled (D.C.) differential amplifier.

The collectors of the transistors 4 and 5 are connected through load resistances 24 to one side 17 of the excitation source, and the emitters of the transistors 4 and 5 are connected through a common line and through the common mode rejection transistor 15, and the bias resistor 26, to the other side 18 of the excitation source.

The collectors of 4 and 5 are connected to the bases of a pair of transistors 1 and 2 connected in differential configuration directly, and differentially connected to the transistors 4 and 5. The collector circuits of the transistors 1 and 2 are connected to one side of the excitation source through load resistors 25, and the emitters of the transistors 1 and 2 are connected through a common mode connection through the collector-emitter circuit of the transistor 3, resistor 8, the bridge 10 and the resistor 9 to the other side 18 of the excitation source. The collectors of transistors 1 and 2 are connected through the negative feedback resistors 22' and 23 to the output corners 11 and 12.

A temperature compensating voltage divider consists of a temperature variable resistor 19, forming the upper leg, and a Zener diode 19', forming the lower leg. The resistor 19 and diode 19' are serially connected from 17 to 18. The base of transistor 3 is connected between the upper and lower legs of the voltage divider, as is the base of the transistor 15, connected through the dropping resistor 17' and the dropping resistor 18'.

A voltage regulator element is provided, composed of a transistor 16 whose collector-emitter circuit is in series with the input 17, and whose base is connected to a voltage divider composed of resistance 21 in the upper leg, connected to 17, and the Zener diode 20 in the lower leg, connected to 18. The base of the transistor 16 is connected to the voltage divider between 21 and 20.

A capacitor 22 is shunted between the emitter of 16 and the other side 18 of the excitation source.

The amplifier, as shown in FIG. 2, is a two-stage differential direct coupled (D.C.) amplifier employing a voltage regulator on the excitation source. In the differential D.C. amplifier, the current passing through the common mode or junction mode of the emitter circuits of the transistors 1 and 2 is constant and independent of signal. With the transistors properly biased to the normal linear operating region, the total current through the bridge will not vary in substantial degree, regardless of the input signal, i.e., the magnitude of the potential difference between 11 and 12, for normal operation of the bridge.

The input signals to the base of the transistors of the differential amplifier stage are of equal magnitude yet opposite in phase, so as one transistor draws more current the other will draw less current. The sum of these currents is thus constant.

Thus, in FIG. 2, as transistor 1 tends to draw more current, transistor 2 will draw less current by an equal amount. The current at the collector of transistor 3 ideally would then be constant. However, in practice, this ideal condition may not obtain, due to the inability to match transistors and the components in the emitter-to-collector circuits of the transistors 1 and 2 for all environmental conditions. An additional source of inequality of the signal to the bases of transistors 1 and 2 from the collectors of the first-stage transistors 4 and 5 may occur because of imbalance in the system arising from mis-matching of transistors 4 and 5. Because of such inequalities, a common mode signal is generated in the emitter circuit of transistors 1 and 2.

The purpose of the transistor 3 is two-fold. Transistor 3 can be considered a constant current generator, in that the current passing through the transistor 3 is clamped by the Zener voltage of the Zener diode 19', the resistor 17' and 18 and the impedance of the bridge. The total impedance of the bridge 10 is constant at any temperature, regardless of the physical stimulus which varies the relative impedances of the legs 10' of the bridge. It is independent of the voltage at the collector of transistor 3. The common mode signal from transistors 4 and 5 entering the base of transistors 1 and 2 will be discriminated against and not amplified.

The bridge 10 is placed in series with the collector-emitter circuit of the second amplification stage 1 and 2, so that the potential at the base of the transistors 4 and 5 is maintained above that at the emitters of the transistors 4 and 5. This will permit the transistors 4 and 5 to be forward biased and not in cutoff condition, as would be the case if the bridge were placed in the collector-emitter circuit of the transistor 15 instead of transistor 3.

Transistor 15 introduces a large impedance in the common mode network of the transistors 4 and 5, as does also the transistor 3 for transistors 1 and 2. The use of high common mode rejection in the input stage permits discrimination against common mode signals at low signal levels. The use of the two common mode transistors 3 and 15 insure that the changes in excitation voltage at 17 and 18 are discriminated against, and, thus, a line voltage regulator of lesser sensitivity and discriminating power may be employed. The resistances 8 and 9 also aid in establishing the proper bias at the collectors of 1 and 2.

The above circuit may be modified by omitting transistors 3 or 15 or both transistors 3 and 15. However, since the circuit desirably should operate over relatively wide limits of input voltage and over relatively wide limits of temperature, the use of both the transistors 3 and 15, as described, is an advantage. Transistor 16 acts to aid in limiting the effect of relatively wide swings of input voltages 17 and 18. The combination of transistors 16, 3 and 15 acts to stabilize the voltages to the various components of the system and substantially eliminate variations of line voltage and effect of temperature changes, aided by the temperature compensated voltage dividers herein described.

The resistances 17' and 18', acting with the voltage divider composed of resistance 19 and Zener diode 19', establish the common mode potential at the base of the transistor 3 and, by virtue of the dropping resistors 17' and 18', establish also the base potential of transistor 15. The Zener diode 19' is usefully employed instead of a passive resistor, since the regulator transistor 16 need not then be of an infinite rejection type. The Zener diode 19' and the resistance 19 give a further voltage regulation to establish the proper operating potential at the base of 3 and 15.

Under conditions where temperature changes materially affect the relative impedance of the legs of the bridge 10, I may employ span compensation resistors to modify or remove the effect of such temperature changes upon the output of the bridge. Such span compensation resistors are conventionally employed in strain wire bridges.

Thus, for example, resistor 9 may be a temperature sensitive resistor whose characteristic is such as to compensate for changes in the output voltage at 13 and 14 as a result of temperature changes. Where the resistance of the Wheatstone bridge legs are modified as a result of some condition to be sensed by a transducer containing mechanical parts and linkages, relative expansions or contractions of the mechanical parts and the effect of temperature changes on the elements of the electrical circuitry change the value of the output voltage across 11 and 12, although the condition sensed by the transducer, which effects the changes in the resistances of the bridge legs, remains unchanged. Examples of such systems are, for example, but not as a limitation of my invention, transducers such as pressure gages and accelerometers employing strain wires illustrated in U.S. Patents 3,058,348; 2,958,056; 2,840,675; 2,760,037; 2,600,701; 2,573,286; 2,453,601; and 2,453,548.

In these transducers, two of the arms of the bridge are increased in tension, and two decreased in tension, responsive to a condition sensed by the transducer. Other transducers of resistive type are, for example, pressure gages and accelerometers employing potentiometers. In such potentiometers, the slide is connected to a force sensing means so that the output resistance is varied responsive to the condition sensed by the transducer.

In contrast with the systems where the differential amplifier is in parallel with the bridge and the excitation potential 17 and 18, the voltage regulation of the excitation voltage is simplified in the system of my invention. The requirement for regulation of the excitation current is less stringent since the system of my invention employs the common mode network described above to supply regulation of line voltage. In a conventional parallel type system, this advantage is not available, and consequently a much more sophisticated regulator is required in such cases. This draws a considerable amount of power to operate the regulator. Further, the bridge, when in parallel to the input voltage and the amplifier, being itself a resistive device, draws current. The amplifier in parallel with the bridge also draws current.

In the system of my invention, the requirement on the line voltage regulator is not as stringent, since the total current drain is reduced in comparison with the parallel system. The common mode current of the differential amplifier in my system is employed to pass through the Wheatstone bridge as the excitation current, thus limiting the current drain on the current source at 17 and 18.

Illustrative of the advantages attainable by the system of my invention, as compared to equivalent circuits in which the same components are employed but in which the input corners of the bridge are connected in parallel with the power source and the output corners in parallel with the differential amplifiers, the following is given by way of example, and not as a limitation of my invention.

In the system of my invention employed to amplify signals from a 750 ohm strain gage bridge, as, for example, from a bridge such as is illustrated in the Statham Patent No. 3,058,348, employing 28 volts excitation and obtaining 5 volts at the output of the amplifier, the total current demand was 3 milliamps and the total current in the bridge was 2.0 milliamps. This may be compared with an amplifier employing the same components in the same circuit as in FIG. 2 and a transducer employing a 750 ohm bridge, except that transistor 3 is omitted and the input corners 14 and 13 are connected in parallel with 17 and 18, and having the same excitation of 28 volts and a 5 volt output, in which the current demand is 25 milliamps, and the current flow in the bridge is above 5.25 milliamps.

It will be seen that the heating effect of the current in the bridge and the total current demand are each about 12%–15% of that in the parallel arrangement.

It will be recognized that, by suitable arrangement of polarities, NPN or PNP transistors and other types of stages may be employed in place of the transistors illustrated in the above drawings and specification.

While I have described particular embodiments of my invention for the purpose of illustration, it should be understood that various modifications and adaptations thereof may be made within the spirit of the invention, as set forth in the appended claims.

I claim:

1. Circuit apparatus for providing a signal corresponding to a change in physical condition, comprising; bridge circuit means responsive to said condition having a pair of input terminals and a pair of output terminals whereby a signal is provided at the output terminals upon modification of the bridge circuit means in response to change in said condition; a pair of three-electrode transistors arranged with their emitter-collector paths across an excitation voltage source and commonly poled, one of the output terminals being fed into the base of the first transistor, the other output terminal being fed into the base of the second transistor; third and fourth three-electrode transistors each having their emitter-collector paths arranged across the voltage source and said transistors being poled the same, one of the same electrodes in each emitter-collector path of the first and second transistors being connected to a respective base of the third and fourth transistors; and the input terminals of the bridge circuit means being serially arranged between one terminal of the voltage source and the emitter-collector paths of said third and fourth transistors.

2. Circuit apparatus as in claim 1 in which a further three-electrode transistor has its emitter-collector path serially arranged between the third and fourth transistors and the bridge means input terminal.

References Cited

UNITED STATES PATENTS

| | | | |
|---|---|---|---|
| 2,615,999 | 10/1952 | Culicetto | 339—146 X |
| 2,795,697 | 6/1957 | Nagel | 328—3 X |
| 2,805,311 | 9/1957 | Fluegel et al. | 328—3 X |
| 3,305,734 | 2/1967 | Buttenhoff | 328—3 X |

NATHAN KAUFMAN, *Primary Examiner.*